United States Patent [19]

Stiff

[11] 4,102,328

[45] Jul. 25, 1978

[54] SOLAR HEATING AND CONTROL SYSTEM

[76] Inventor: John E. Stiff, 3111 S. Valley View, Las Vegas, Nev. 89102

[21] Appl. No.: 710,799

[22] Filed: Aug. 2, 1976

[51] Int. Cl.² .......................................... F24J 3/02
[52] U.S. Cl. .................................. 126/271; 237/1 A
[58] Field of Search ............... 126/270, 271; 237/1 A; 4/172.12, 172.14

[56] References Cited

U.S. PATENT DOCUMENTS

| 3,200,820 | 8/1965 | Garrett | 126/271 |
| 3,815,574 | 6/1974 | Gaydos | 126/271 |
| 3,906,928 | 9/1975 | Wright | 126/271 |
| 3,934,323 | 1/1976 | Ford et al. | 126/271 |
| 3,970,069 | 7/1976 | Pickett | 126/271 |
| 4,024,908 | 5/1977 | Meckler | 126/271 |

FOREIGN PATENT DOCUMENTS

| 2,505,015 | 8/1975 | Fed. Rep. of Germany | 126/271 |
| 2,535,581 | 2/1976 | Fed. Rep. of Germany | 126/271 |
| 246,216 | 9/1947 | Switzerland | 126/271 |

*Primary Examiner*—Kenneth W. Sprague
*Assistant Examiner*—James C. Yeung
*Attorney, Agent, or Firm*—Bacon & Thomas

[57] ABSTRACT

A solar energy collector panel has inlet and outlet header tubes provided with longitudinal slots which terminate short of ends of the header tubes and the ends of a matrix panel extend into those slots and are sealed to the header tubes and provides flow channels between the headers. A water circulating pmp and valve arrangement pumps water from a pool, through the collector and back to the pool only when available radiant energy is sufficient to further heat the water. Control of the pump and valve is effected by comparing signals from an infrared sensor near the collector panel and temperature sensor in the pool.

4 Claims, 8 Drawing Figures

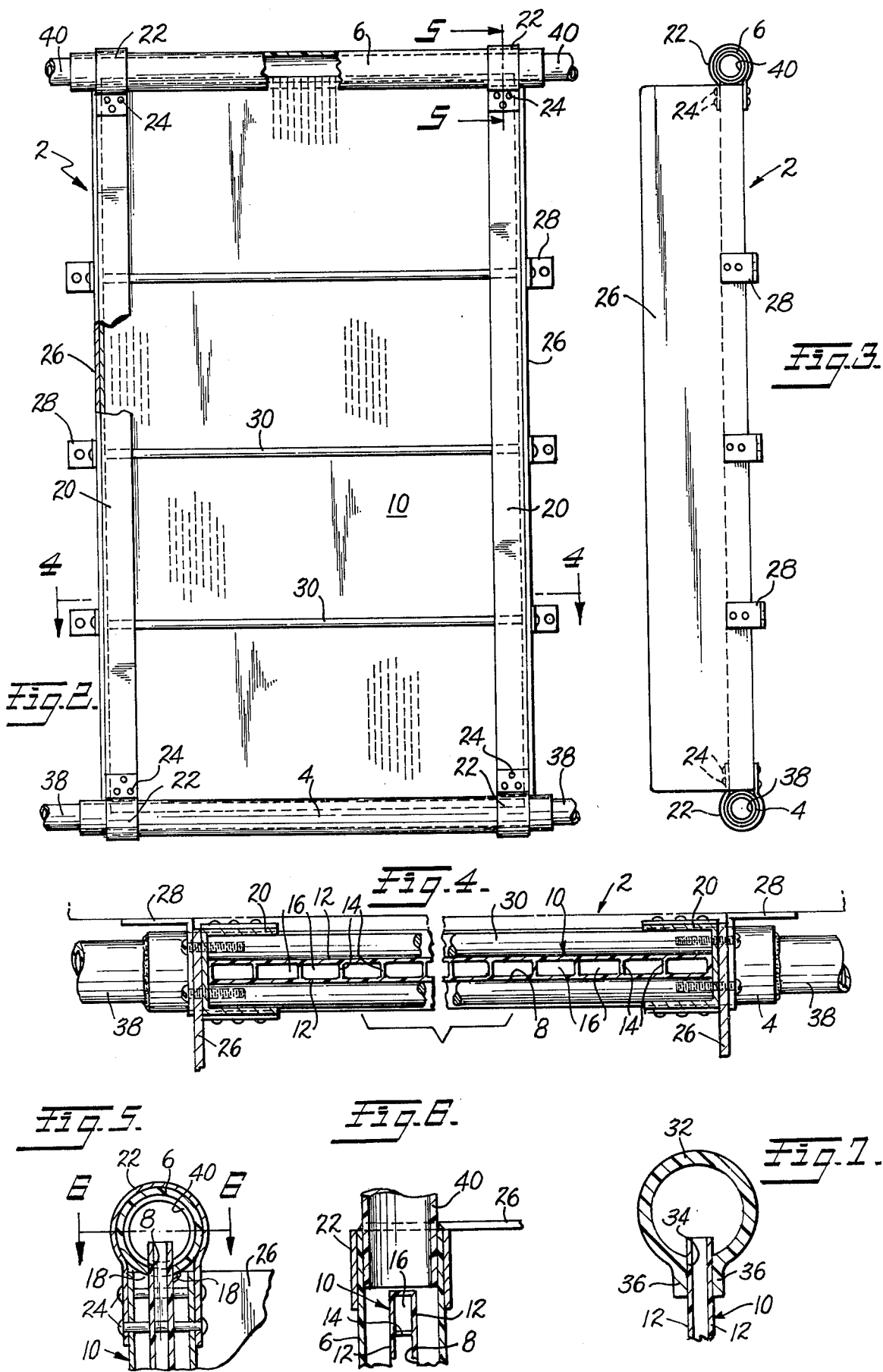

4,102,328

SOLAR HEATING AND CONTROL SYSTEM

BACKGROUND OF THE INVENTION

This invention is in the field of solar energy collecting devices and control means therefor.

The use of solar energy for heating water or the like is well known and has been proposed in many forms. Some of the simpler proposals have been to provide a flat envelope-like device transparent to or absorptive of infrared energy and through which water is circulated to absorb heat and become warmed. Such devices, however, did not take into account the fact that during periods of cloudiness or the like, the available radiant energy may not be sufficient to add any heat to the water or other medium being circulated and it was necessary to manually terminate circulation or permit the circulated water to become cooled in the so-called heat absorbing device. Such prior devices further were generally of a nature requiring permanent installation on a roof top or the like.

SUMMARY OF THE INVENTION

The present invention provides a solar energy absorbing panel structure of simple and economical construction and capable of being installed in many configurations and locations, for circulating water from a swimming pool, for example, through the apparatus and back to the swimming pool. The present invention also includes control means whereby water from the pool is caused to flow through the energy absorbing panels only when the available radiant energy is of sufficient intensity to add heat to the water. In other words, if the available radiant energy is very low, the control means operates to discontinue flow of water through the radiant energy absorber while permitting continued circulation of cool water through the usual filter device.

It is, therefore, a principal object of this invention to provide a solar energy collector system that is simple in construction yet economical and reliable in operation.

A further object is to provide a solar energy collector system automatically responsive to the intensity of ambient solar radiation whereby the energy collector is operative only when available radiant energy is sufficient to provide additional heat to a heat absorbing medium therein.

BRIEF DESCRIPTION OF THE DRAWINGS

FIG. 3 is a side view of the panel in FIG. 2;

FIG. 4 is a transverse sectional view taken along the line 4—4 of FIG. 2;

FIG. 5 is an enlarged fragmentary sectional view taken on the line 5—5 of FIG. 2;

FIG. 6 is a sectional view taken on the line 6—6 of FIG. 5;

FIG. 7 is a fragmentary sectional view showing a modified form of header; and

FIG. 8 is a block diagram of the control arrangement of the present invention.

DESCRIPTION OF THE PREFERRED EMBODIMENTS

Figure 1:
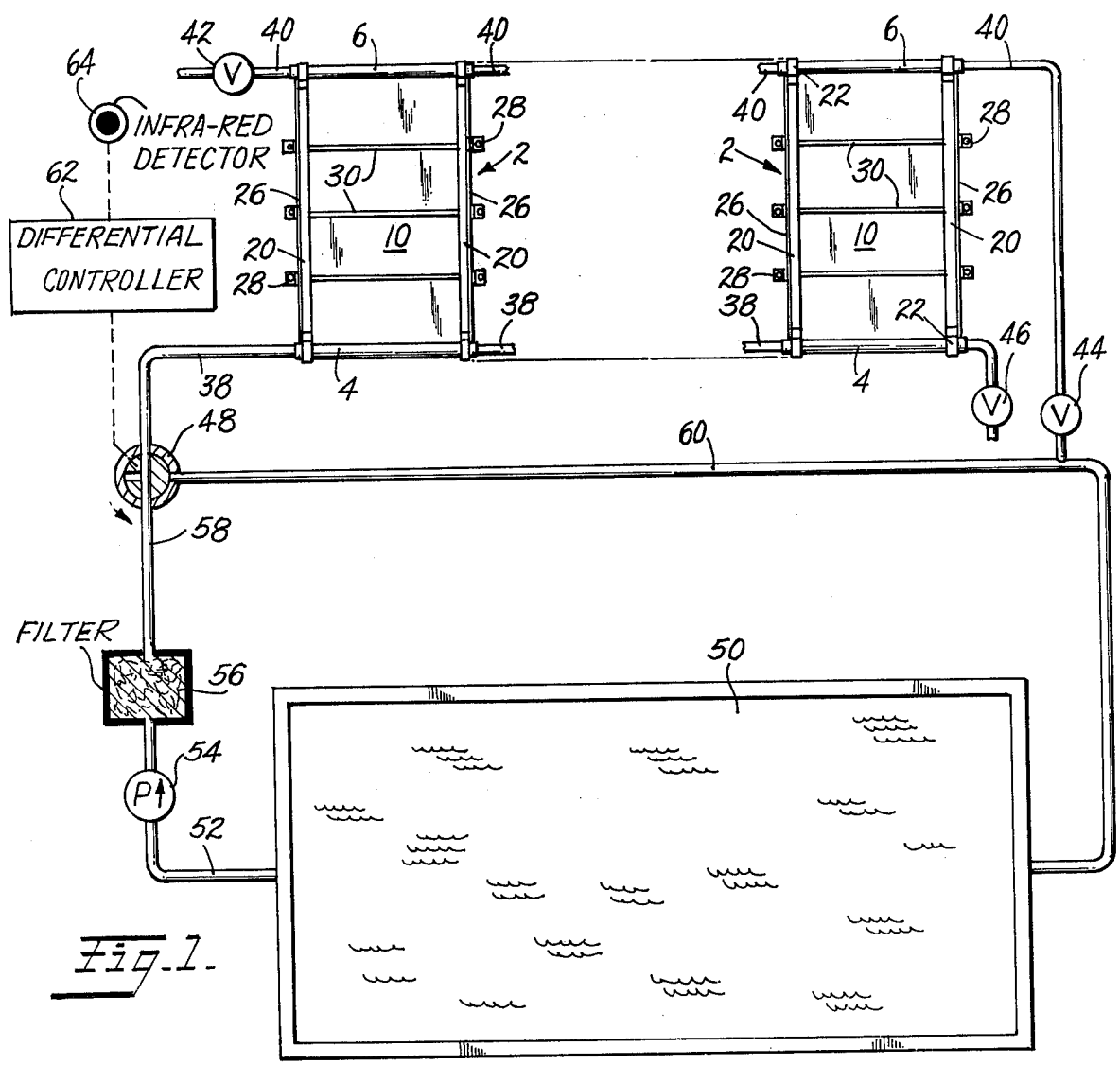
FIG. 1 is a schematic representation of a system embodying the present invention.
Figure 2:
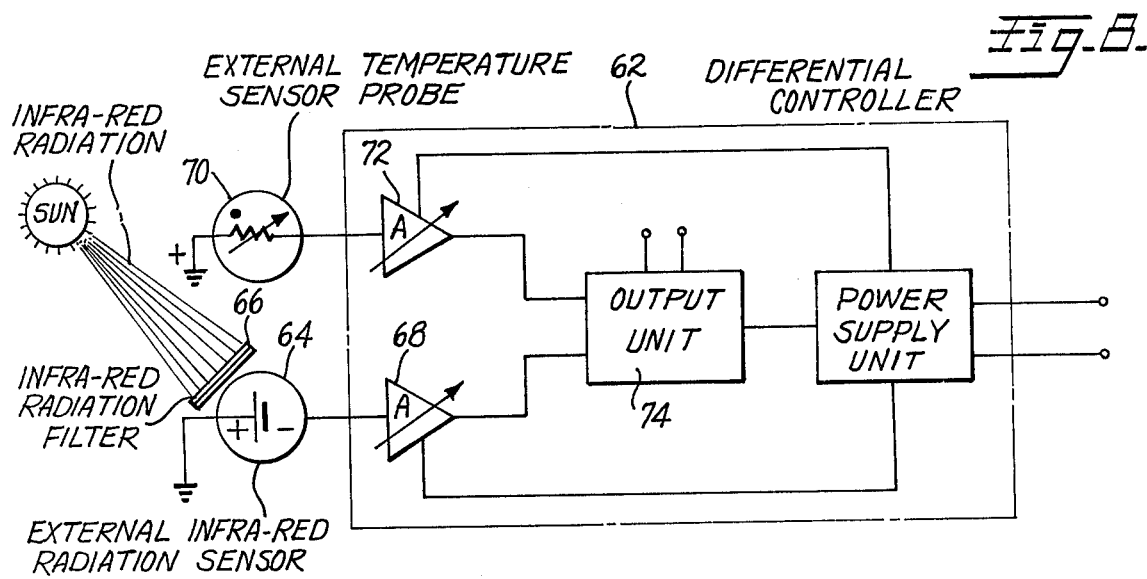
FIG. 2 is a front elevational view of a panel constructed in accordance with this invention.

Referring first to FIG. 1, numeral 2 designates generally the solar heat absorbing panels, any number of which may be employed in an array, only two of which are shown in the drawings. Each panel is provided with an inlet header 4 and an outlet header 6. Each of the headers 4 and 6 is in the form of a tubular conduit provided with a longitudinal slot 8 therein (see FIGS. 5 and 6). In each header the slot 8 terminates short of the ends of the header itself, leaving a circumferentially continuous end portion at each end of the conduits. Between the headers 4 and 6 there extends a matrix panel 10 preferably formed of parallel spaced sheets 12 which may be of any suitable plastic or the like and extending between the sheets 12 are partitions 14 which divide the space between the sheets 12 into a multiplicity of parallel flow channels 16. The ends of the matrix panels 10 are of essentially the same dimensions as the slots 8 and the ends of the panels extend fairly snugly through those slots into the respective headers 4 and 6. Preferably, the open ends of the flow channels 16 extend inwardly of the inner periphery of the headers 4 and 6 since this facilitates assembly of the parts and construction of the panel although such inward projection is not essential. The matrix panels 10 are cemented or otherwise sealed to the headers 4 and 6 throughout the peripheries of the slots 8, as at 18 in FIG. 5 so that the headers and flow channels define a sealed flow path for a heat absorbing medium. It is to be noted that the width of the panels 10 is equal to the length of the slots 8 previously described.

Extending along opposite side edges of the matrix panel 10 and in embracing relation to those edges are frame members 20, the frame members 20 are shown as being in the form of channels but may be of any other desired configuration and are preferably substantially rigid to protect the edges of the matrix panel and to hold the panel structures 2 in the desired configuration. The frame members 20 may be of extruded aluminum or any other suitable material. The frame members 20 extend between headers 4 and 6 and suitable clamping loops 22 serve to secure the frame members 20 to the respective headers by means of the rivets 24 (FIG. 5) or the like. From FIG. 6 it will be apparent that the rivets 24 may extend between the walls of the frame members 20 outwardly of the outer edges of the matrix panel 10. In many instances it is also desirable to protect the surfaces of the matrix panel 10 from excessive air currents which would have the effect of cooling those surfaces and rendering the heat absorption of the device less efficient. Applicant proposes to provide each frame member 20 with a flange member 26 extending generally perpendicular to the plane of the matrix panel 10 and projecting a substantial distance outwardly from the face thereof. The flanges 26 thus function as shielding devices to deflect air currents away from the matrix panel 10.

Also, as shown in the drawings, the frame members 20 and/or flanges 26 are provided with brackets 28 useful in securing the panel to an upright wall or other support.

As shown, spreader rods 30 extend between the frame members 20 to further strengthen and rigidify the panels disclosed.

FIG. 7 illustrates an alternative form of header wherein the tubular portion 32 is provided with a longitudinal slot 34 of the length already described but wherein the edges of the slots 34 extend outwardly to define flanges 36 providing a greater surface for bonding and sealing against the matrix panel 10.

Any desired number of the panels 2 may be arranged in suitable array to intercept the sun's rays and effect heating of a medium pumped therethrough. Preferably, the panels will be facing in a generally southerly direction and will preferably be arranged to extend at an angle of from 30° to 50° from the vertical to intercept a maximum amount of solar radiation. The sheets 12 may be opaque or transparent, as desired. If the rearmost sheet 12 is transparent it should have a layer of heat reflective material behind it and it is also contemplated that heat insulation be applied to the rear side of the panels 2.

Preferably the front sheet 12 should be opaque and the rear sheet 12 should be black or other dark color. This will prevent loss by black reradiation from the front surface of the panel.

As shown in FIG. 1, conduit means 38 interconnect the inlet headers 4 of all the panels of the array and may comprise simple tubular conduits extending into and sealed to the ends of the headers 4 in the manner illustrated in FIG. 6. In like manner, conduit means 40 interconnect the outlet headers 6 of the panels of the array. In FIG. 1, the inlet headers and the outlet headers are shown connected in series relationship although it is to be understood that they may be interconnected in parallel relationship if desired.

From one of the end panels of the array the conduit means 40 is provided with a vent valve 42 which will be described later. At the other end of array the conduit means 40 is provided with a valve 44 which will also be described later. The conduit means 38 at one end of the array terminates in a valve 46 and at the other end of the array the conduit means 38 extends into a two-way valve 48 to be described later. Numeral 50 designates a swimming pool shown merely by way of example, from the bottom of which a conduit 52 leads to pump 54 for withdrawing water from the pool and pumping the same through a filter device 56. From the filter 56 a conduit 58 extends to the valve 48 and a return conduit 60 extends from the valve 48 back to the pool 50. The portion of conduit means 40 containing valve 44 communicates with the return conduit 60 just described. The valve 48 previously referred to is a two-way valve preferably operated by suitable solenoid means (not shown) to positions wherein conduit 58 communicates with conduit 38 while conduit 60 is blocked or to a position wherein conduit 58 communicates with contact 60, conduit 38 being blocked. Such valves are well known and need not be further described.

Upon installation of the system shown, it will be apparent that the matrix panels 10 contain air as do the various conduits described. To place the device in operation it is essential that substantially all air be evacuated from the system. When it is desired to fill the system with water, the valves 46 and 44 are closed and valve 42 is opened, with valve 48 in the position shown in the drawings. The pump is then started and pumps water into the inlet headers 48 and upwardly through the flow channels 16, the valve 42 being opened permits the air to be vented from the system. When the panel array is filled with water, valve 44 is then opened and valve 42 closed whereby water from the pump is caused to circulate through the panels 2 and return to the pool via conduit 60. Whenever it is desired to drain the panel array, the valve 48 may be set to the other position described and valves 42 and 46 opened. Valve 46 allows all water to drain from the panel array while open valve 42 permits air to enter the system and replace the drained water.

FIG. 1 also shows in block form a differential controller device 62 which is provided with means for sensing the temperature of the water in the pool 50 and for sensing the intensity of solar radiation in the vicinity of the array of panels. Infrared detector 64 serves this latter purpose. The differential controller 62 controls the valve 48 to place the same in either of its described positions in accordance with ambient and pool conditions, as will be described.

FIG. 8 is a block diagram of the differential controller 62 and associated devices. The infrared detector 64 is depicted in FIG. 8 and preferably suitable filters 66 are provided so that the detector 64 responds only to infrared radiation to produce a signal which is directed to an amplifier 68. Numeral 70 designates a temperature sensing probe, preferably being immersed in the water of the pool 50 to respond to the temperature thereof and to produce an output signal proportional to that temperature and which is fed to amplifier 72. Thus, the outputs of amplifiers 68 and 72 are proportional to the intensity of infrared radiation and the temperature of the pool water, respectively. Those amplified signals are applied to the output unit 74 wherein signals are compared or added algebraically. In the event the signal from sensor 64 indicates that the intensity of infrared radiation in the vicinity of the panel array drops to a value too low to produce enough heat to further warm the pool water which is at a temperature represented by the signal from amplifier 72, the output unit function to direct a pulse to the solenoid operated valve 48 to turn it to its second position wherein water from the filter 56 is directed back to return conduit 60 and wherein flow through conduit means 38 is blocked. Thus, pool water sufficiently warm so that it cannot be further heated by solar energy will not be circulated through the panels 2. If the output unit 74 is provided with a signal indicating a high intensity of infrared radiation, the output of the unit will place or leave the valve 48 in the position shown in FIG. 1, wherein pool water is circulated through the panels 2 for further heating. The details of the output unit 74 are not shown since various circuits for performing such functions are well known and could be devised by those skilled in the art. It is preferred, however, that at least the signal from sensor 64 be directed through a suitable delay device, delaying application of the signal to the unit 74 for a desired period of time, several seconds or more. Such a delay feature is desirable to prevent shutting off circulation through the panels 2 in response to mere transitory cloudiness or temporary shading of the sensor 64 by birds or other means. Such a delay circuit may readily take the form of an RC network of the desired time constant.

While a single specific embodiment of the invention has been shown herein, the same is merely illustrative of the principles involved and other forms may be resorted to within the scope of the appended claims.

I claim:

1. A solar energy collector panel array, each panel comprising:
   a tubular inlet header and a tubular outlet header, said headers being arranged in spaced parallel relation and each having a longitudinal slot in the side thereof facing the other header, said slots being of less length than said headers and terminating inwardly of the ends thereof;

a generally planar matrix panel comprising spaced parallel sheets, one of which is black and the other of which is clear and a multiplicity of parallel partitions extending between said sheets to define adjacent flow channels having open ends at opposite ends of said matrix panel, the width of said matrix panel transverse to said flow channels being substantially equal to the length of said slots in said headers;

said opposite ends of said matrix panel extending through said slots in respective headers and being sealed thereto and said flow channels being free of constrictions to provide unobstructed communication between the interiors of said inlet and outlet headers;

said array of panels being arranged with panels in side-by-side relation, first conduit means interconnecting adjacent unslotted ends of said inlet headers, second conduit means interconnecting adjacent unslotted ends of said outlet headers, and pump means for circulating a heat absorbing fluid medium from a supply thereof to said inlet headers, through said flow channels to said outlet headers and back to said supply;

means for selectively directing said medium from said pump means to said inlet headers or directly back to said supply;

means for sensing the intensity of infrared radiation in the vicinity of said array of panels and providing a first signal proportional to said intensity;

means for sensing the temperature of said medium in said supply and providing a second signal proportional to said temperature; and means for comparing said first and second signals and for controlling said valve means to direct medium from said pump means to said inlet headers only when said infrared radiation is sufficient to further heat said medium from said supply.

2. A panels as defined in claim 1 including substantially rigid frame members extending along and embracing opposite side edges of said matrix panel and being secured to said headers by clamp loops extending around the same.

3. A panel as defined in claim 2 wherein said frame members are provided with wind deflecting flange members extending therealong and projecting therefrom in a direction generally perpendicular to the plane of said matrix panels.

4. A panel as defined in claim 2 wherein said frame members are provided with brackets fixed thereon for securing said panels to a supporting structure.

* * * * *